US008149544B2

(12) United States Patent
Deguchi et al.

(10) Patent No.: US 8,149,544 B2
(45) Date of Patent: Apr. 3, 2012

(54) HARD DISK DRIVE WITH RECESSED ACTUATOR JOINT

(75) Inventors: Takaaki Deguchi, San Jose, CA (US);
Jr-Yi Shen, Sunnyvale, CA (US);
Kunihiro Shida, San Jose, CA (US);
Hitoshi Shindo, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1031 days.

(21) Appl. No.: 12/098,909

(22) Filed: Apr. 7, 2008

(65) Prior Publication Data

US 2009/0251826 A1 Oct. 8, 2009

(51) Int. Cl.
*G11B 5/55* (2006.01)

(52) U.S. Cl. .................................. 360/265.6; 360/265.5

(58) Field of Classification Search ............... 360/265.2, 360/265.5, 265.6
See application file for complete search history.

(56) References Cited

U.S. PATENT DOCUMENTS

| | | | | |
|---|---|---|---|---|
| 4,797,762 | A * | 1/1989 | Levy et al. | 360/99.06 |
| 5,469,311 | A | 11/1995 | Nishida et al. | |
| 5,587,855 | A | 12/1996 | Kim | |
| 6,122,138 | A | 9/2000 | Khanna et al. | |
| 6,256,173 | B1 * | 7/2001 | Chee et al. | 360/265.7 |
| 6,480,363 | B1 | 11/2002 | Prater | |
| 6,501,615 | B1 | 12/2002 | Kelsic et al. | |
| 6,710,966 | B1 | 3/2004 | Codilian et al. | |
| 6,914,743 | B1 | 7/2005 | Narayana et al. | |
| 6,947,260 | B2 | 9/2005 | Dominguez et al. | |
| 7,280,353 | B2 | 10/2007 | Wendel et al. | |
| 7,355,812 | B2 * | 4/2008 | Byun et al. | 360/97.02 |
| 7,570,460 | B2 * | 8/2009 | Kitahori et al. | 360/265.6 |
| 7,733,601 | B2 * | 6/2010 | Hayakawa et al. | 360/97.02 |
| 2002/0167762 | A1 * | 11/2002 | Kan et al. | 360/265.2 |
| 2006/0126227 | A1 * | 6/2006 | Kitahori et al. | 360/265.2 |
| 2006/0146449 | A1 | 7/2006 | Yao et al. | |

FOREIGN PATENT DOCUMENTS

JP 2006-190452 7/2006

OTHER PUBLICATIONS

Lee, et al., "VCM Design to Improve Dynamic Performance of Actuator in a Disk Drive", *Asia-Pacific Magnetic Recording Conference*, 2004. APMRC 2004 Volume, Issue, Aug. 16-19, 2004. www.ieeexplore.ieee.org/search/srchabstract?arnumner=1521922 &isnumber32546&punumber=10205&k2dockey= 1521922@ieeecnfs&query=%28%28vcm+design+to+i mprove+dynami, (Aug. 2004),2 pages.

Fazzio, et al., "Head actuator dynamics of an IBM 5¼-inch disk drive", D.P. Fazzio, M. A. Moser, C. J. Polson, J. N. Scheffel, *IBM J. Res. Develop.* vol. 37 No. 4., (Jul. 1993),479-490.

* cited by examiner

*Primary Examiner* — Jefferson Evans

(57) ABSTRACT

Components and assemblies for a hard disk drive (HDD) with a recessed actuator joint are described. A rotary actuator hub assembly comprises a shaft having a flange, and a pivot seat on which the flange is seated when the shaft is fastened to an HDD chassis. According to an embodiment, the pivot seat has at least one "contact-reducing feature" recessed from the surface of the pivot seat at which the seat contacts the flange. A purpose of the contact-reducing feature(s) of the pivot seat is to weaken the joint between the actuator hub assembly and the chassis, thereby mechanically loosening the rotary actuator assembly from the chassis. Consequently, movements to and vibrations from the chassis are less likely to be transmitted to the rotary actuator assembly and, ultimately, to the HDD read/write head(s).

18 Claims, 9 Drawing Sheets

HARD DISK DRIVE WITH RECESSED ACTUATOR JOINT

TECHNICAL FIELD

Embodiments of the invention relate generally to the field of hard disk drives and, more specifically, to a hard disk drive rotary actuator assembly.

BACKGROUND ART

Electronic computing devices have become increasingly important to data computation, analysis and storage in our modern society. Modem direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Consequently, there are seemingly constant development efforts to improve the areal density of the media implemented in hard disk drives, where the areal density is measured as the product of bits per inch ("BPI") and tracks per inch ("TPI"). BPI refers to the number of bits that can be written and later reread per linear inch along a track, whereas TPI refers to the number of individual tracks per radial inch. Advancements in areal density result in very narrow data tracks and, therefore, it becomes more and more difficult to align the read/write head accurately on top of the recording track when under vibration. When under vibration, mechanical components such as the spindle disk pack and the actuator are moved, thereby increasing NRRO (non-repeatable runout) and misalignment between the read/write heads and the corresponding disks.

SUMMARY OF EMBODIMENTS OF THE INVENTION

Components and assemblies for a hard disk drive (HDD) with a recessed actuator joint are described. A rotary actuator hub assembly comprises a shaft having a flange, and a pivot seat on which the flange is seated when the shaft is fastened to an HDD chassis. According to an embodiment, the pivot seat has at least one "contact-reducing feature" recessed from the surface of the pivot seat at which the seat contacts the flange. According to various embodiments, contact-reducing features of the pivot seat include an annular groove and/or multiple recesses, such as circular and/or elliptical recesses. Further, according to another embodiment, a contact-reducing feature may comprise multiple protrusions protruding up from a circular recess having the same diameter as the flange.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Figure 1:
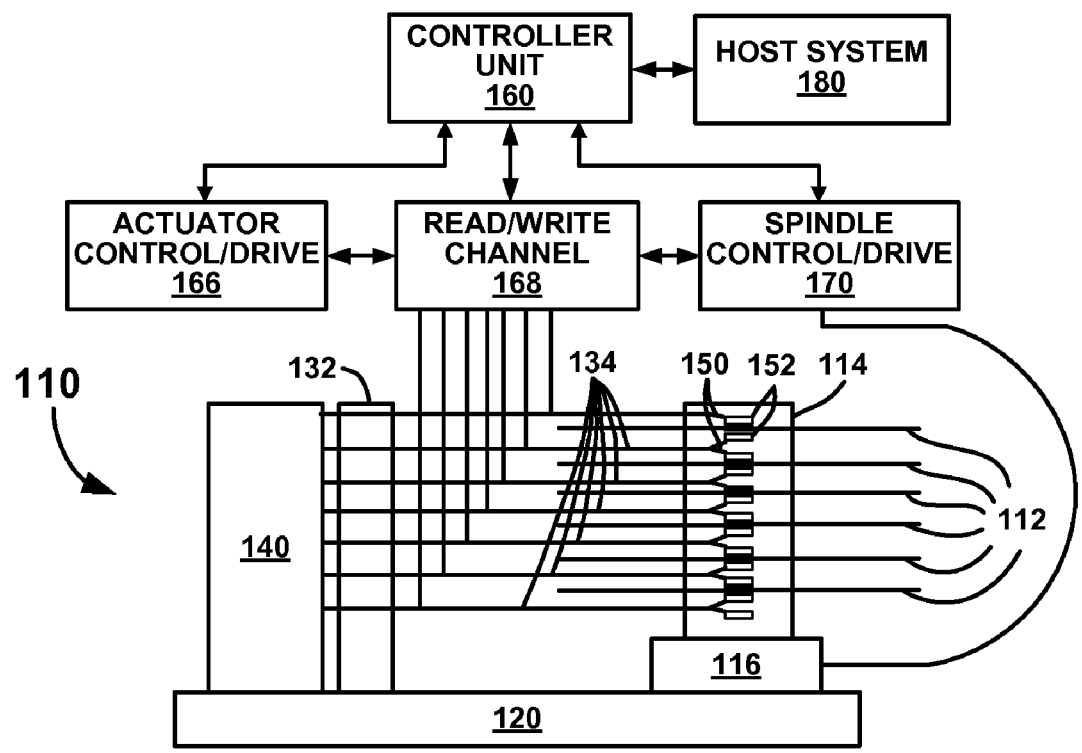
FIG. 1 illustrates a side view of a disk drive system, according to an embodiment of the invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

Embodiments of the invention comprise components and assemblies for a hard disk drive (HDD) device with a recessed actuator joint. A rotary actuator hub assembly comprises a shaft having a flange, and a pivot seat on which the flange is seated when the shaft is fastened to an HDD chassis. According to an embodiment, the pivot seat has at least one "contact-reducing feature" recessed from the surface of the pivot seat at which the seat contacts the flange. A purpose of the contact-reducing feature(s) of the pivot seat is to weaken the joint between the actuator hub assembly and the chassis, thereby mechanically isolating, to an extent, the rotary actuator assembly from the chassis. Consequently, vibrations from the chassis are less likely to be transmitted to the rotary actuator assembly.

It should be understood by those skilled in the art that various embodiments of the invention increase the performance quality of a hard disk drive (HDD) under vibration by reducing a cause of misalignment between heads and disks.

Numerous specific embodiments will now be set forth in detail to provide a more thorough understanding of the present technology. The discussion of these detailed embodiments will begin with an overview of a hard disk drive (HDD), and the components connected therein, according to embodiments of the invention. The discussion will then focus on embodiments of the invention that provide a HDD rotary actuator hub assembly having a recessed joint with the HDD chassis, and corresponding HDD devices.

Although embodiments of the present invention will be described in conjunction with a rotary actuator assembly in a hard disk drive, it is understood that the embodiments described herein are useful outside of the art of HDD design, manufacturing and operation. The utilization of the HDD actuator assembly example is only one embodiment and is provided herein merely for purposes of brevity and clarity.

Hard Disk Drive (HDD) Configuration

Figure 2:
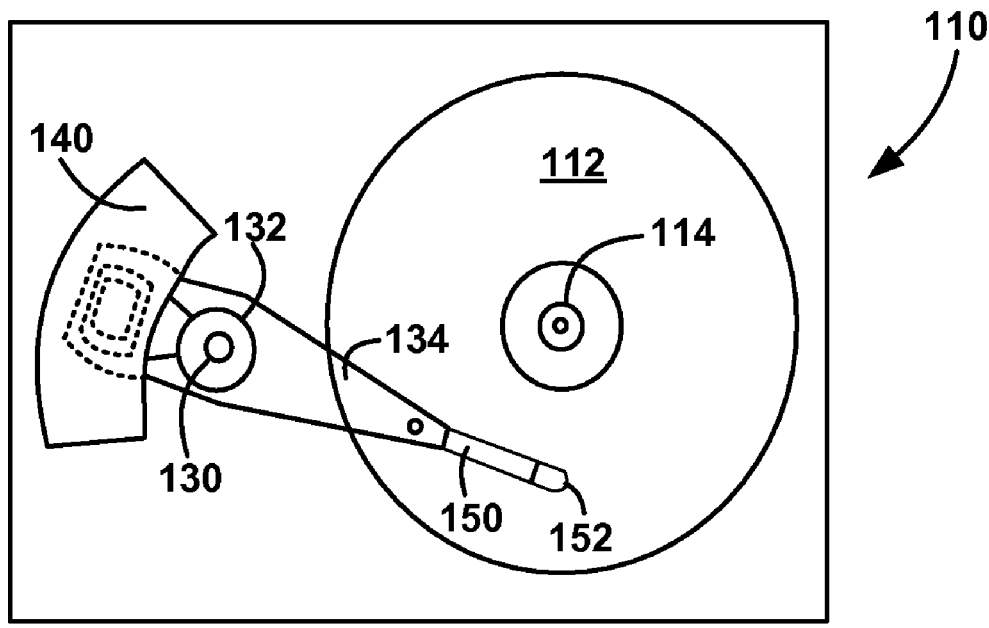
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Actuator Hub Assembly

Figure 3A:
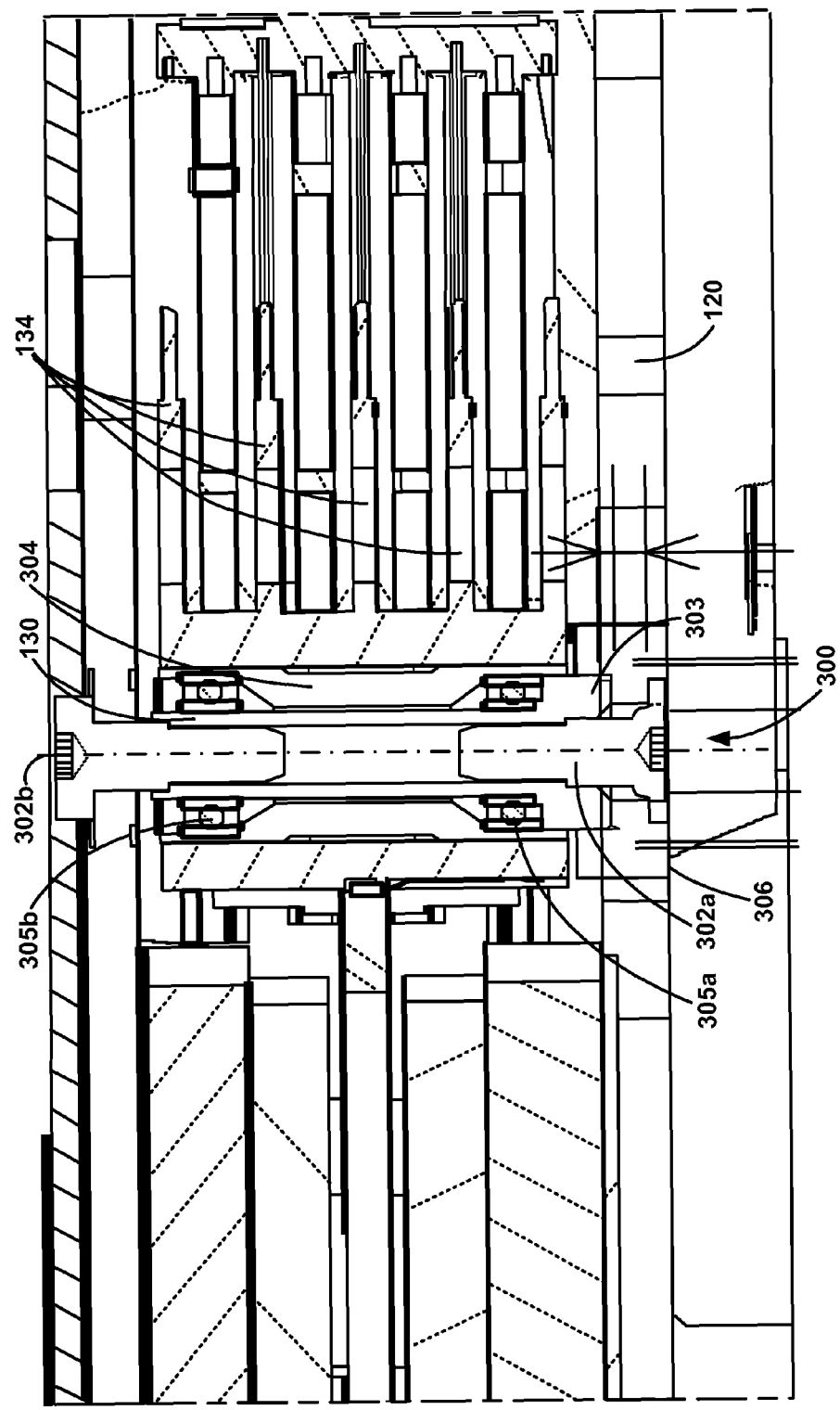
FIG. 3A is a cross-sectional view of a portion of a typical hard disk drive, illustrating an actuator hub assembly and associated components.

FIG. 3A is a cross-sectional view of a portion of a typical hard disk drive, illustrating an actuator hub assembly 300, such as hub assembly 132 of FIGS. 1 and 2, and associated components. Actuator hub assembly 300 comprises the actuator shaft 130 (FIGS. 1 and 2) having a bottom flange 303, encircled by a sleeve 304 and bearings 305a, 305b, and attached to the chassis 120 (FIG. 1) via screws 302a and 302b. Screws 302a and 302b couple the actuator shaft 130 to the chassis 120 through a pivot seat 306. Pivot seat 306 is typically coupled to chassis 120 using, for example, an interference or press fit. As mentioned, a hub assembly, such as hub assembly 300, typically supports a plurality of actuator arms 134.

Figure 3B:
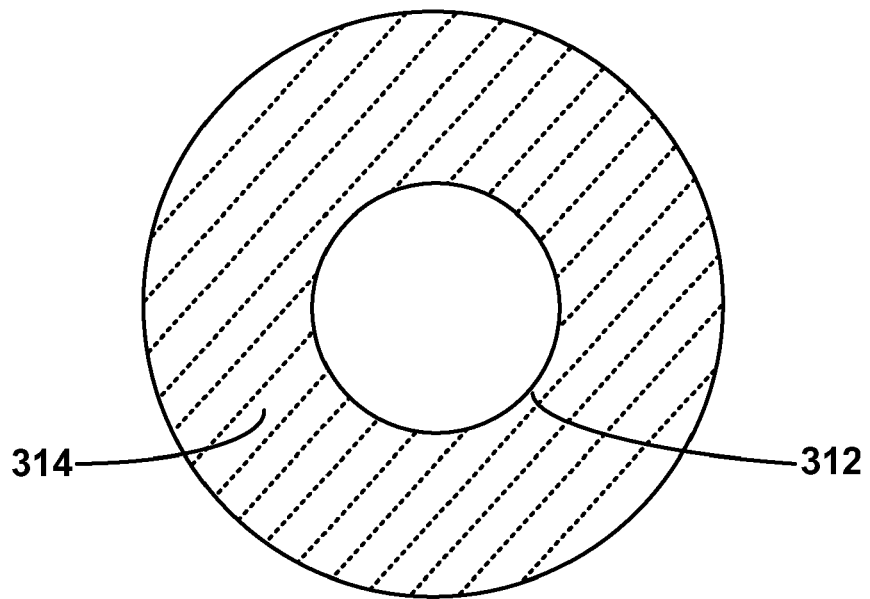
FIG. 3B is a diagram illustrating a contact surface area associated with the actuator shaft and the pivot seat corresponding to the configuration of the actuator hub assembly of FIG. 3A.

FIG. 3B is a diagram illustrating a contact surface area corresponding with the actuator shaft 130 and the pivot seat 306, according to the configuration of actuator hub assembly 300 of FIG. 3A. FIG. 3B depicts a shaft area 312, which approximates the bottom profile of the hollow portion of actuator shaft 130 which, when assembled, has screw 302a affixed therethrough. FIG. 3B further depicts a contact surface area 314, which approximates the surface area at which the bottom flange 303 contacts with pivot seat 306 in a static (e.g., non-vibratory) condition.

Figure 4A:
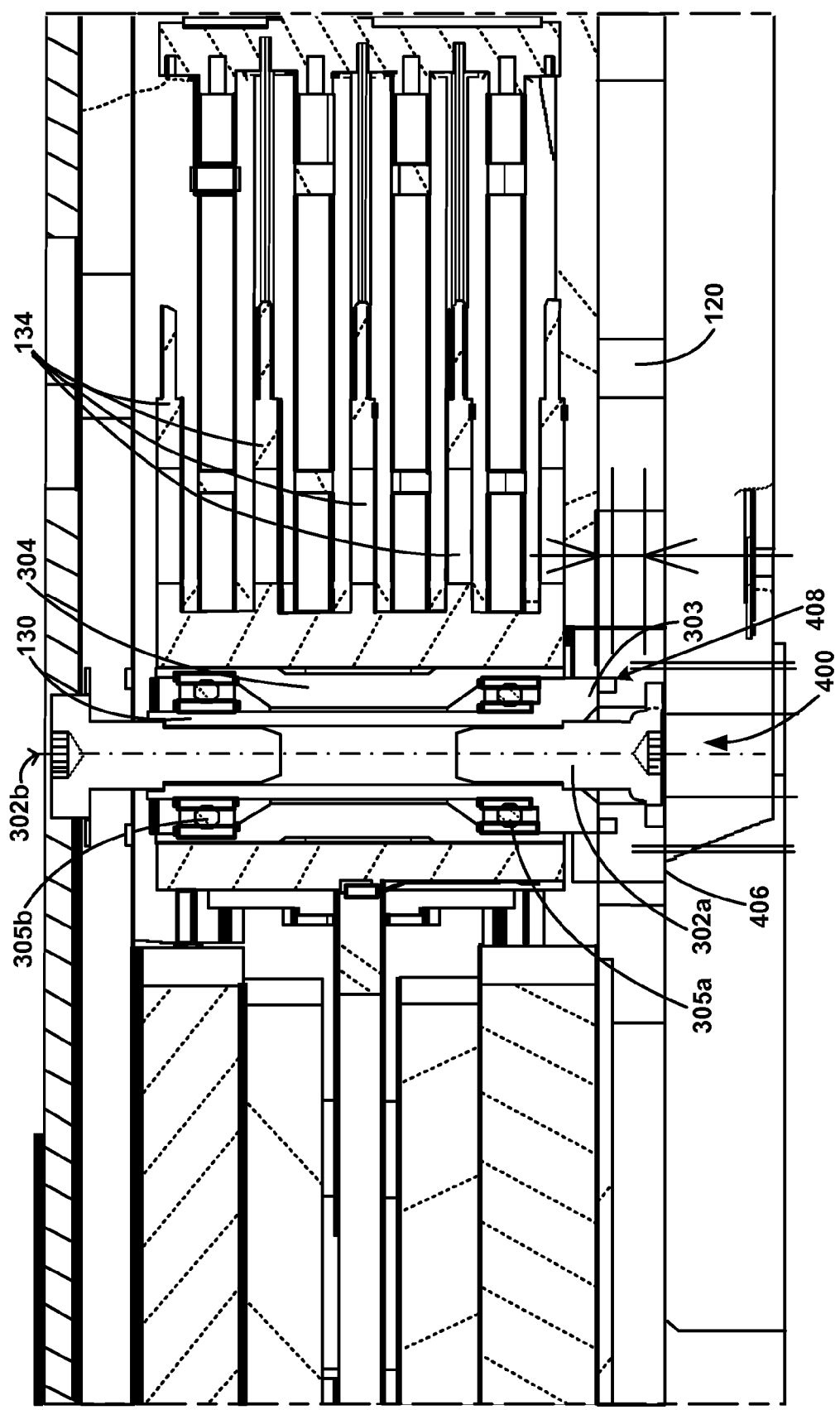
FIG. 4A is a cross-sectional view of a portion of a hard disk drive, illustrating an actuator hub assembly and associated components, according to an embodiment of the invention.

Actuator Hub Assembly Having a Contact-Reducing Pivot Seat Contact-Reducing Annular Groove FIG. 4A is a cross-sectional view of a portion of a hard disk drive, illustrating an actuator hub assembly 400 and associated components, according to an embodiment of the invention. As with the actuator hub assembly 300 of FIG. 3A, actuator hub assembly 400 comprises the actuator shaft 130 (FIGS. 1 and 2) having a bottom flange 303, encircled by a sleeve 304 and bearings 305a, 305b, and attached to the chassis 120 (FIG. 1) via screws 302a and 302b. According to this embodiment, screws 302a and 302b couple the actuator shaft 130 to the chassis 120 through a pivot seat 406. The hub assembly 400 of FIG. 4A is also shown supporting a plurality of actuator arms 134.

The pivot seat 406 comprises an annular groove 408. According to an embodiment, annular groove 408 is configured to be substantially coaxial with the shaft 130. According to an embodiment and as depicted in FIG. 4A, the outer diameter of annular groove 408 is substantially coincident with the outer diameter of the bottom flange 303. For a non-limiting example, the annular groove 408 may be approximately 1.0 mm wide and 0.7 mm deep. A purpose of the annular groove 408 of pivot seat 406 is to weaken the joint between the actuator hub assembly 400 and the chassis 120, thereby mechanically isolating, to an extent, the rotary actuator assembly from the chassis 120. Consequently, with the configuration depicted in FIG. 4A, movements to and vibrations from the chassis 120 are transmitted to the rotary actuator assembly to a lesser extent than with the configuration depicted in FIG. 3A. Therefore, performance of the hard disk drive under vibration is improved, e.g., misalignment between the heads and disks is reduced.

Figure 4B:
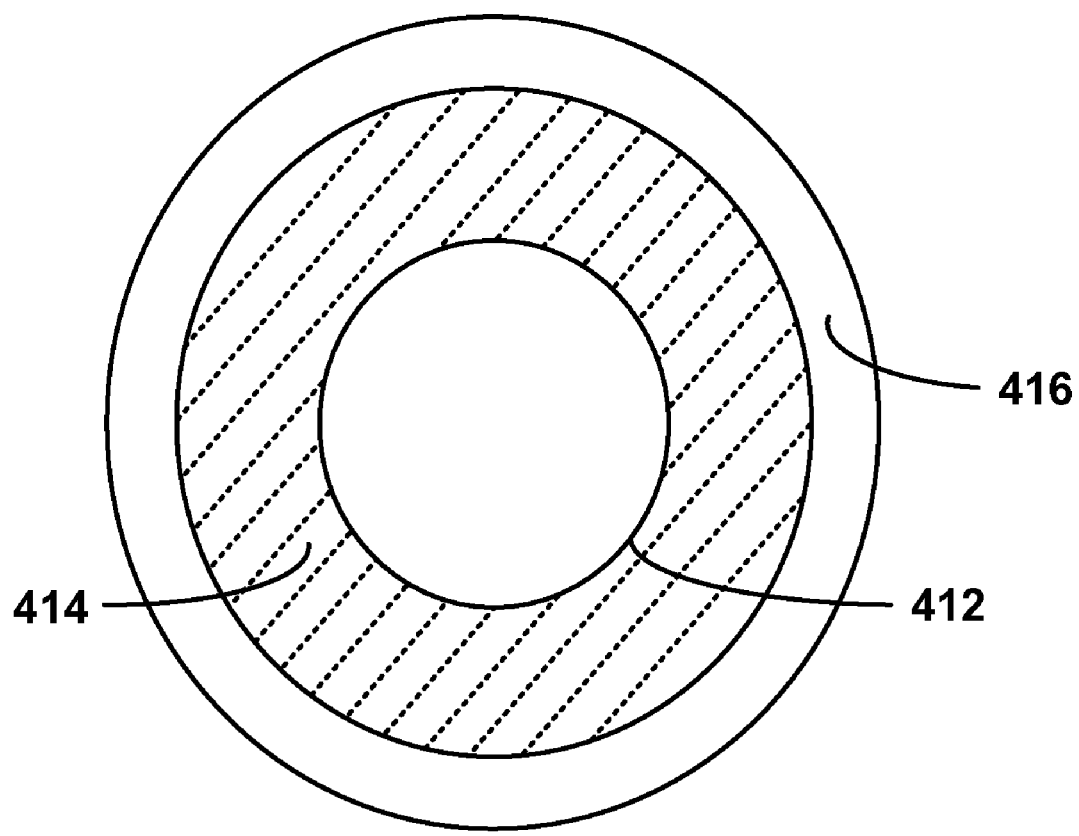
FIG. 4B is a diagram illustrating a contact surface area associated with the actuator shaft and the pivot seat corresponding to the configuration of the actuator hub assembly of FIG. 4A, according to an embodiment of the invention.

FIG. 4B is a diagram illustrating a contact surface area associated with the actuator shaft 130 and the pivot seat 406, corresponding to the configuration of actuator hub assembly 400 in the embodiment depicted in FIG. 4A. FIG. 4B depicts a shaft area 412, which approximates the bottom profile of the hollow portion of actuator shaft 130 which, when assembled, has screw 302a affixed therethrough. FIG. 4B further depicts a contact surface area 414, which approximates the surface area at which the bottom flange 303 contacts with pivot seat 406 in a static condition, and a non-contact area 416. A comparison of contact surface area 414 with the contact surface area 314 of FIG. 3B shows that the contact surface area 414 is less than the contact surface area 314, because of annular groove 408. Thus, annular groove 408 functions as a "contact-reducing feature" of the pivot seat 406, in the context of the physical relationship between bottom flange 303 of shaft 130 and pivot seat 406.

Contact-Reducing Recessed Shapes

Figure 5A:
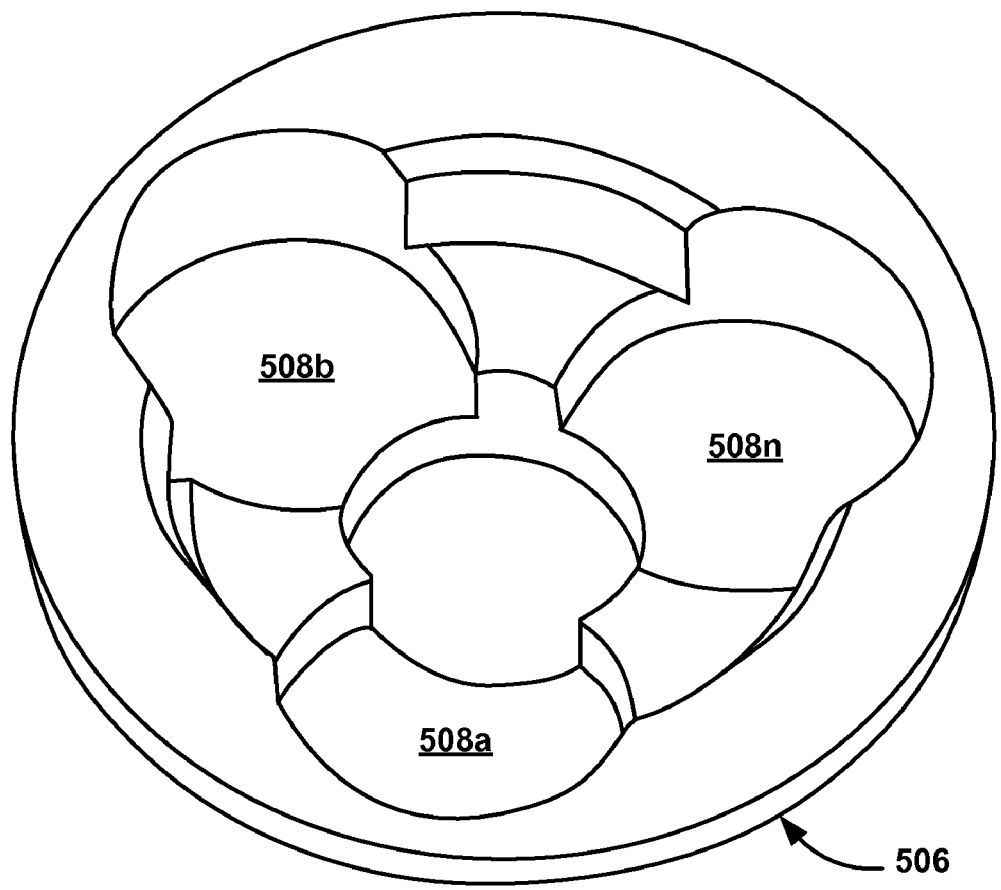
FIG. 5A is an isometric view of an example contact-reducing pivot seat, according to an embodiment of the invention.

FIG. 5A is a generally isometric view of an example contact-reducing pivot seat, according to an embodiment of the invention. Pivot seat 506 comprises multiple contact-reducing features that are recessed into the pivot seat, i.e., recessed from the surface of the pivot seat at which the shaft flange 303 and the pivot seat 506 contact when coupled.

According to one embodiment, and as depicted in FIG. 5A, pivot seat 506 comprises a plurality of contact-reducing recesses which, in this example, are circular recesses 508a, 508b-508n. However, embodiments of the invention are not limited to use of circular recesses, for other shapes of recesses could be used to obtain similar effects to the actuator attachment joint to the chassis. For non-limiting examples, elliptical or arcuate recesses could be configured in pivot seat 506. Further, embodiments of the invention are not limited to use of three recesses as depicted in FIG. 5A, for other numbers of recesses (as denoted by the general notation 508n) could be used to obtain similar effects to the actuator attachment joint.

According to one embodiment, and as depicted in FIG. 5A, pivot seat 506 comprises a plurality of circular contact-reducing recesses which, in this example, are equidistant apart (e.g., 120° apart). However, embodiments of the invention are not limited to use of equidistant recesses, for the recesses could be spaced apart at different and unequal polar angles. One skilled in the art will appreciate that the shape and the separation angles of contact-reducing features of a pivot seat may vary from implementation to implementation, based, for example, on the actual or modeled forces that transmit from the chassis to the actuator hub assembly via the corresponding pivot seat.

Figure 5B:
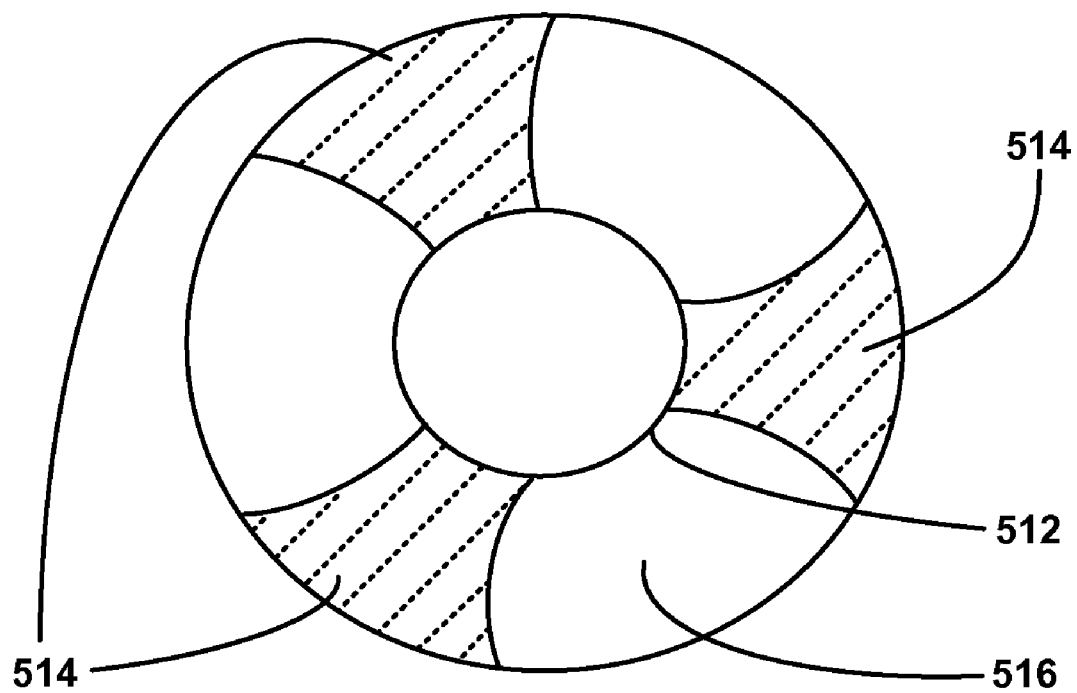
FIG. 5B is a diagram illustrating a contact surface area associated with the actuator shaft and the pivot seat corresponding to the embodiment of the invention depicted in FIG. 5A.

FIG. 5B is a diagram illustrating a contact surface area associated with the actuator shaft 130 and the pivot seat 506, corresponding to the embodiment depicted in FIG. 5A. FIG. 5B depicts a shaft area 512, which approximates the bottom profile of the hollow portion of actuator shaft 130 which, when assembled, has screw 302a affixed therethrough. FIG. 5B further depicts contact surface areas 514 (collectively denoted as surface area 514), which approximate the surface area at which the bottom flange 303 contacts with pivot seat 506 in a static condition, and non-contact areas 516 (collectively denoted as surface area 516). A comparison of contact surface 514 with the contact surface area 314 of FIG. 3B shows that the contact surface area 514 is less than the contact surface area 314, because of the recesses 508a-508n. Thus, the circular recesses 508a-508n function as "contact-reducing features" of the pivot seat 506, in the context of the physical relationship between bottom flange 303 of shaft 130 and pivot seat 506.

Contact-Reducing Protrusions

According to an embodiment of the invention, a contact-reducing feature comprises a "recess/protrusion" feature, which comprises (a) a circular, generally planar, recess having an outer diameter approximating the outer diameter of the shaft flange 303; and (b) a plurality of protrusions protruding from the circular recess in a direction toward the flange 303, e.g., protruding upwards. Different shapes, quantities, and configurations of protrusions may be implemented in such a pivot seat, based on actual or modeled forces that transmit from the chassis to the actuator hub assembly via the corresponding pivot seat.

Figure 6:
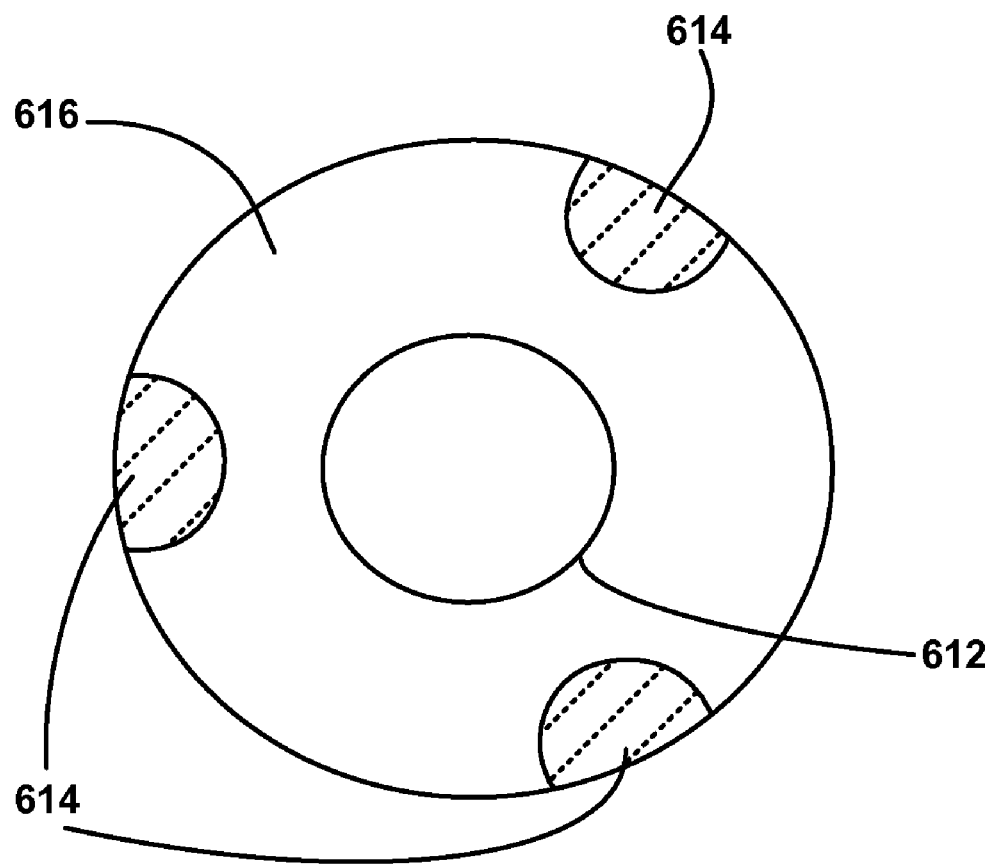
FIG. 6 is a diagram illustrating a contact surface area associated with an actuator shaft and a pivot seat corresponding to a "recess/protrusion" approach, according to an embodiment of the invention.

FIG. 6 is a diagram illustrating a contact surface area associated with the actuator shaft 130 and a pivot seat corresponding to the foregoing "recess/protrusion" embodiment. FIG. 6 depicts a shaft area 612, which approximates the bottom profile of the hollow portion of actuator shaft 130 which, when assembled, has screw 302a affixed there through. FIG. 6 further depicts contact surface areas 614 (collectively denoted as surface area 614), which approximate the surface area at which the bottom flange 303 contacts with the pivot seat protrusions in a static condition, and non-contact areas 616 (collectively denoted as surface area 616). The shape of the protrusions depicted in FIG. 6 is a partial ellipse, approximately equidistant apart, for purposes of example and not limitation. As depicted, partial shapes may be used for the protrusions, for example, for ease in manufacturing.

A comparison of contact surface area 614 with the contact surface area 314 of FIG. 3B shows that the contact surface area 614 is less than the contact surface area 314, because of the relatively small protrusions protruding from a relatively large recess. Thus, the recess/protrusion configuration functions as a "contact-reducing feature" of the pivot seat, in the context of the physical relationship between bottom flange 303 of shaft 130 and pivot seat.

It should be understood that although various embodiments of the present invention are described in the context of a rotary actuator assembly in a hard disk drive (HDD), the foregoing embodiments are merely exemplary of various implementations of principles of the present technology. Therefore, it should be understood that various embodiments of the invention described herein may apply to any devices, configurations, or systems in which rotary actuators are employed.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A hard disk drive rotary actuator hub assembly, comprising:
    a shaft, comprising a flange;
    a pivot seat on which said flange is seated, said pivot seat comprising at least one contact-reducing feature recessed from a surface of said pivot seat at which said flange and said pivot seat contact when coupled, said at least one contact-reducing feature comprises an annular groove; and
    a fastener coupling said shaft to a hard disk drive chassis through said pivot seat.

2. The hard disk drive rotary actuator hub assembly recited in claim 1, wherein said at least one contact-reducing feature comprises a plurality of recesses.

3. The hard disk drive rotary actuator hub assembly recited in claim 2, wherein said plurality of recesses comprises a plurality of circular recesses.

4. The hard disk drive rotary actuator hub assembly recited in claim 3, wherein said circular recesses are a substantially equal angular distance apart.

5. The hard disk drive rotary actuator hub assembly recited in claim 3, wherein said plurality of recesses comprises three circular recesses at a substantially equal angular distance apart.

6. The hard disk drive rotary actuator hub assembly recited in claim 2, wherein said plurality of recesses comprises a plurality of elliptical recesses.

7. The hard disk drive rotary actuator hub assembly recited in claim 1, wherein said at least one contact-reducing feature comprises (a) a circular recess having an outer diameter substantially equal to an outer diameter of said flange and (b) a plurality of protrusions protruding from said circular recess in a direction toward said flange.

8. The hard disk drive rotary actuator hub assembly recited in claim 7, wherein said plurality of protrusions comprises a plurality of at least a portion of circular protrusions.

9. The hard disk drive rotary actuator hub assembly recited in claim 7, wherein said plurality of protrusions comprises three circular protrusions at a substantially equal angular distance apart.

10. The hard disk drive rotary actuator hub assembly recited in claim 7, wherein said plurality of protrusions comprises a plurality of at least a portion of elliptical protrusions.

11. A hard disk drive device comprising:
a base;
a magnetic storage medium assembly coupled with said base, said magnetic storage medium rotatable relative to said base;
a rotary actuator hub assembly, comprising,
a shaft, comprising a flange;
a sleeve encircling a portion of said shaft and rotatable relative to said shaft;
one or actuator arms coupled with said sleeve and rotatable relative to said shaft, said one or more actuator arms housing one or more corresponding read/write heads for reading data from and writing data to said magnetic storage medium;
a pivot seat on which said flange is seated, said pivot seat comprising a contact-reducing feature recessed from a surface of said pivot seat at which said flange and said pivot seat contact when coupled, said contact-reducing feature comprises a plurality of circular recesses; and
a fastener coupling said shaft to said base through said pivot seat.

12. The hard disk drive device recited in claim 11, wherein said contact-reducing feature comprises an annular groove.

13. The hard disk drive device recited in claim 11, wherein said circular recesses are a substantially equal angular distance apart.

14. The hard disk drive device recited in claim 11, wherein said plurality of recesses comprises three circular recesses at a substantially equal angular distance apart.

15. The hard disk drive device recited in claim 1, wherein said contact-reducing feature comprises (a) a circular recess having an outer diameter substantially equal to an outer diameter of said flange and (b) a plurality of protrusions protruding from said circular recess in a direction toward said flange.

16. The hard disk drive device recited in claim 15, wherein said plurality of protrusions comprises a plurality of at least a portion of circular protrusions.

17. The hard disk drive device recited in claim 15, wherein said plurality of protrusions comprises three circular protrusions at a substantially equal angular distance apart.

18. The hard disk drive device recited in claim 15, wherein said plurality of protrusions comprises a plurality of at least a portion of elliptical protrusions.

* * * * *

UNITED STATES PATENT AND TRADEMARK OFFICE
CERTIFICATE OF CORRECTION

PATENT NO. : 8,149,544 B2  
APPLICATION NO. : 12/098909  
DATED : April 3, 2012  
INVENTOR(S) : Takaaki Deguchi et al.

Page 1 of 1

It is certified that error appears in the above-identified patent and that said Letters Patent is hereby corrected as shown below:

Col. 8, Claim 15, Line 17: Delete: "Claim 1"  
Insert: "Claim 11"

Signed and Sealed this  
Fourteenth Day of August, 2012

David J. Kappos  
*Director of the United States Patent and Trademark Office*